(No Model.)
G. A. ELLIS & E. L. TAFT.
STANDARD FOR CHILDREN'S CARRIAGES.
No. 319,569. Patented June 9, 1885.
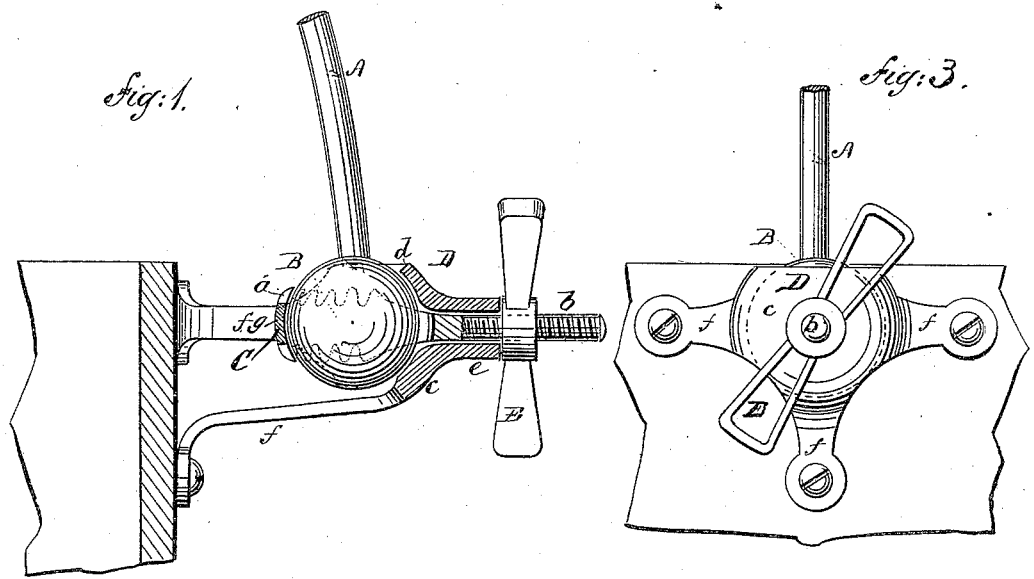
Fig: 1.
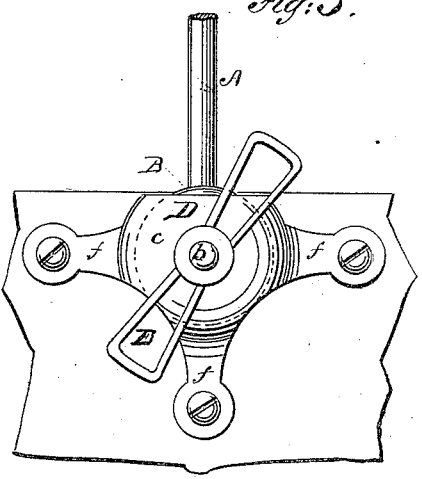
Fig: 3.
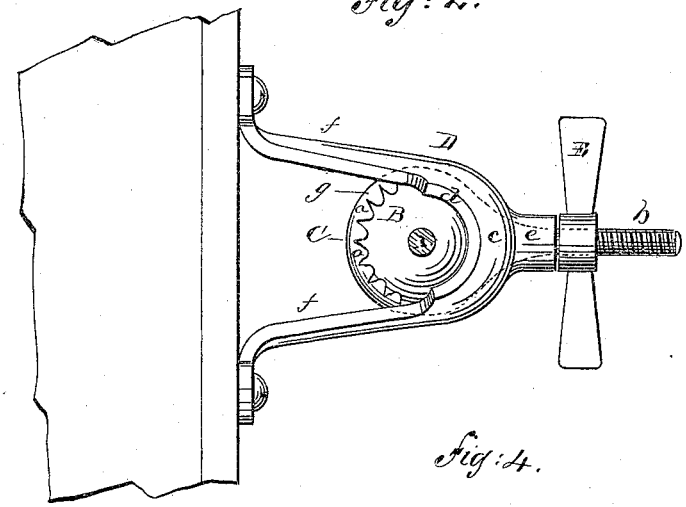
Fig: 2.
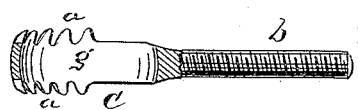
Fig: 4.
WITNESSES:
Chas. Nida.
Edward L. Johns
INVENTOR
George A. Ellis and
Edward L. Taft
BY
ATTORNEY

UNITED STATES PATENT OFFICE.

GEORGE A. ELLIS AND EDWARD L. TAFT, OF GARDNER, MASSACHUSETTS, ASSIGNORS TO HENRY HEYWOOD, GEORGE HEYWOOD, ALVIN M. GREENWOOD, AND AMOS MORRILL, OF SAME PLACE.

STANDARD FOR CHILDREN'S CARRIAGES.

SPECIFICATION forming part of Letters Patent No. 319,569, dated June 9, 1885.

Application filed December 11, 1883. (No model.)

*To all whom it may concern:*

Be it known that we, GEORGE A. ELLIS and EDWARD L. TAFT, both of Gardner, county of Worcester, State of Massachusetts, have invented a new and useful Improvement in Standards for Children's Carriages and Like Vehicles; and we do hereby declare the following to be a full, clear, and exact description of the same, reference being had to the accompanying sheet of drawings, forming part of this specification.

This invention is in the nature of an improvement in standards for children's carriages and like vehicles; and the invention consists in a canopy-standard, combined with the adjustable joint hereinafter particularly described, shown, and claimed.

In the accompanying sheet of drawings, Figure 1 is a side elevation of our standard-joint, partly in section; Fig. 2, a plan or top view of same; Fig. 3, a side elevation; Fig. 4, a sectional detail view of ring, with teeth and screw-shank.

Similar letters of reference indicate like parts in the several figures.

This invention pertains to an adjustable joint for the standards of canopies to be employed in combination with children's carriages and similar vehicles, so that the canopy can be placed at any desired angle, to the front, rear, or to either side of the carriage to shield the occupant from the sun or rain. The joint is practically a ball-and-socket joint; but since a ball-and-socket joint of ordinary construction is expensive, inasmuch as the ball of the joint must be turned accurately to a spherical form, and its accompanying socket in like manner turned to bear accurately around the surface of the sphere, the expense of such a joint, however well adapted it may be to the purpose of permitting the adjustment of the canopy-standards, when properly made, has interfered with its general adoption. To construct such a joint, however, that will preserve all the essential features of the most carefully made ball-and-socket joint, we secure to the end of our standard A the ball or sphere B, which ball or sphere need not be finished up after it has been taken from the mold in which it is cast. The diameter of the ball is left entirely to the taste, judgment, and convenience of the manufacturer. A seat, C, for the ball is also cast, either of brass, or, if of iron, rendered malleable by the ordinary process. The seat is practically a ring of metal, $g$, provided with teeth $a$ on each edge extending around about one half of the circumference of the ring. The other half of the circumference of the ring is prolonged into a screw-shank, $b$, on which are cut ordinary screw-threads. A bracket, D, made also of cast metal, is formed with a semicircular or dome-shaped portion, $c$. This dome is recessed to a curvature corresponding somewhat to the curvature of the ball B, and it is provided on one side with a bevel-edge, $d$. The dome is also prolonged into a neck, $e$, through which neck is a cylindrical orifice opening into the interior of the dome. Cast or otherwise fixed to this dome are ordinary bracket-legs, $f$, by means of which the bracket can be attached to the body of the carriage with screws.

Now, our joint, with its parts constructed substantially as hereinbefore described, is operated in the following manner: The ball or sphere B is placed within the ring $g$, and the teeth $a$ of that ring are then hammered or otherwise bent over and in close contact with the surface of the sphere B; the screw-shank $b$ of the ring is then put through the neck $e$ of the dome, and a wing-nut, E, is screwed onto the shank $b$, and as it is screwed onto the shank it abuts against the end of the neck, drawing by that action the ring $g$, with the ball therein, partly within the dome $c$, or until the upper surface of the ball is jammed between the bevel of the dome and the teeth $a$ and inner surface of the ring $g$, which jamming at once fixes the ball to the bracket immovably. Hence it is clear that, since the form of the ball B is spherical, the same adjustment will occur in whatever position the ball may be turned within the ring $g$, and since the standard A, with its canopy attachment, is rigidly attached to the ball B, the canopy can be made to assume any degree of inclination desired, or that may be necessary to shield the occupant of the vehicle.

It is obvious from the foregoing description of the construction and operation of our standard-joint that all its parts may be of cast metal and placed together without further finishing of any kind, and in this way all the useful effects of the carefully-constructed ball-and-socket joint are obtained at very much reduced cost.

Having now described our invention, what we claim as new, and desire to secure by Letters Patent, is—

1. A joint for canopy-standards, consisting of a ball, B, in combination with a ring, g, provided with teeth a, and a bracket, D, as and for the purpose described.

2. In a canopy-standard joint, the following elements in combination: a standard, A, ball B, ring g, with teeth a, and a screw-shank, b, formed thereon, a bracket, D, with a dome-recess, c, and a wing-nut, E.

3. In a canopy-standard joint, the bracket D, having the recessed dome c, provided with a bevel-edge, d, a neck, e, and legs f, combined with a standard, A, and its ball B, and a ball-seat and means to operate it to draw the ball within the dome, substantially as described.

GEORGE A. ELLIS.
EDWARD L. TAFT.

Witnesses:
T. B. DUNN,
J. P. DUNN.